United States Patent [19]

Holland

[11] Patent Number: 4,548,770
[45] Date of Patent: Oct. 22, 1985

[54] SUBJECTING FILM TO CORONA DISCHARGE PRIOR TO COMPRESSION ROLLING

[75] Inventor: Geoffrey J. Holland, San Mateo, Calif.

[73] Assignee: Crown Zellerbach Corporation, San Francisco, Calif.

[21] Appl. No.: 552,939

[22] Filed: Nov. 17, 1983

[51] Int. Cl.⁴ .................................................. B29D 7/22
[52] U.S. Cl. ...................................... 264/22; 264/175; 264/210.2; 264/210.3; 264/280; 425/174.8 E
[58] Field of Search .............. 264/22, 175, 280, 210.1, 264/210.2, 210.3; 425/174.8 E

[56] References Cited

U.S. PATENT DOCUMENTS

| | | | |
|---|---|---|---|
| Re. 27,404 | 6/1972 | Williams, Jr. et al. | 264/175 |
| 3,083,410 | 4/1963 | McGlamery | 264/210.6 |
| 3,194,863 | 7/1965 | Williams, Jr. et al. | 264/175 |
| 3,504,075 | 3/1970 | Williams, Jr. et al. | 264/175 |
| 4,085,187 | 4/1978 | Jenks et al. | 264/280 |

FOREIGN PATENT DOCUMENTS

| | | | |
|---|---|---|---|
| 51-7078 | 1/1976 | Japan | 264/22 |
| 51-37959 | 3/1976 | Japan | 264/22 |
| 52-41687 | 3/1977 | Japan | 264/22 |
| 53-35990 | 9/1978 | Japan | 425/174 |
| 55-21258 | 2/1980 | Japan | 264/22 |
| 58-140217 | 8/1983 | Japan | 264/25 |

*Primary Examiner*—Jeffery Thurlow
*Attorney, Agent, or Firm*—Stanley M. Teigland

[57] ABSTRACT

Compression rolling of a film is improved by subjecting the film to corona discharge prior to the rolling. The corona discharge treatment improves the processability of the film.

4 Claims, No Drawings

SUBJECTING FILM TO CORONA DISCHARGE PRIOR TO COMPRESSION ROLLING

This invention relates to an improved method of compression rolling of plastic film.

The term "compression rolling," as used herein and as understood in the art, refers to the process of passing a plastic film through the nip of a pair of rolls at a temperature below the softening point of the film at a pressure which is sufficient to reduce the thickness of the film at least five percent, preferably at least fifty percent. The length of the film is increased by an amount corresponding to the reduction in thickness. For example, a film whose thickness had been reduced fifty percent by compression rolling has a length which is about twice as great as its original length. Compression rolling is described in U.S. Pat. Nos. 3,504,075 and 4,085,187; which are incorporated herein by reference.

In compression rolling there is an interrelationship between the smoothness of the rolls, the speed of the rolls, the pressure applied by the rolls, and the particular film being rolled. It is desirable to use smooth rolls to enhance the optical properties (e.g. clarity and gloss) of the film, but if the rolls are too smooth, the film tends to slip, i.e., the circumferential speed of the rolls is greater than the speed of the film leaving the nip. Although some slip is tolerable, as taught in U.S. Pat. No. 4,085,187, it is generally desirable to have the speed of the film essentially equal to the speed of the rolls. As the speed of smooth rolls is increased, the amount of the slip is also increased, and as the slip in increased, the tendency of the film to break is increased. The amount of slip can be reduced by increasing the force applied to the film by the rolls, but the increased force reduces the thickness of the film, which may be undesirable. Certain polymers, particularly polyolefins and especially high density and linear medium density polyethylene, tend to slip more than other polymers. Slip is an indicator of the processability of a film. A film with good processability is one which can be run at relatively high speed on relatively smooth rolls at low as well as high compressive forces without breaking.

This invention is based on the discovery that the processability of a film is improved by subjecting the film to corona discharge prior to compression rolling. Subjecting the film to corona discharge for the purpose of improving the receptivity of the surface of the film to printing ink is well known in the art. However, film would never be subjected to corona discharge for that purpose prior to subjecting the film to a process wherein the surface area of the film is increased substantially because the effect of the corona discharge is dissipated when the surface area of the film is increased, such as when the film is stretched monoaxially or biaxially.

The amount of corona discharge to which the film is subjected in accordance with this invention is preferably at least as great as that which is conventionally used to improve the receptivity of the surface of the film to ink, which is equivalent to that which would raise the surface energy of polyethylene film to about 42 dynes/cm. However, a lesser amount of corona discharge would effect some improvement in compression rolling. The film can be subjected to the maximum amount of corona discharge produced by commercially available corona treaters, which is equivalent to that which would raise the surface energy of polyethylene film to about 65 dynes/cm. There is no upper limit to the amount of corona discharge short of that which would damage the film.

After being subjected to the corona discharge, the film is compression rolled in accordance with methods known in the art. The compression rolling is preferably carried out with semiboundary lubrication, as taught in U.S. Pat. No. 4,085,187, with the preferred lubricant being water. The film is preferably rolled at a temperature of about 15° to 80° C., more preferably 20° to 55° C. The thickness of the film is preferably reduced between about 50 and 90 percent. The final thickness of the film is preferably between about 0.5 and 6 mils, more preferably between one and three mils.

This invention is especially applicable to film wherein each surface layer comprises linear polyethylene having a density greater than 0.925, such as linear medium density polyethylene and high density polyethylene (i.e., polyethylene having a density greater than 0.94 g/cc.), which is inherently linear. The polyethylene preferably constitutes at least half of the composition of each surface layer.

When rolls having a certain smoothness are used, this invention permits the film to be run at higher speeds or lower compressive forces. Conversely, when the rolling is carried out at a certain speed, this invention permits the use of smoother rolls or lower compresive forces.

EXAMPLE 1

Linear medium density polyethylene film was subjected to a corona discharge sufficient to raise its surface energy to about 42 dynes/cm. The film was then compression rolled at ambient temperature using water as a lubricant. The smoothness of the work rolls was 8 root means square microinches. The film ran well at speeds over 900 feet per minute.

COMPARATIVE EXAMPLE A

Example 1 was repeated except the film had not been subjected to corona discharge. It was not possible to roll the film at a speed greater than about 500 feet per minute because the film broke at that speed.

EXAMPLE 2

A three-layer coextruded film having a core layer of high density polyethylene and skin layers of a blend of equal parts by weight of high density polyethylene and linear medium density polyethylene was subjected to a corona discharge sufficient to raise the surface energy of the film to about 60 dynes/cm. The film, which had a width of 25 inches, was fed directly from the corona treater to the nip of a pair of rolls. The rolls had a smoothness of 25 root mean square microinches. The force applied by the rolls was between 20 and 21 tons. The circumferential speed of the rolls was 475 feet per minute. The speed of the film leaving the nip was 469.4 feet per minute. Hence, the slip was −5.6 feet per minute. The ratio of the thickness of the film entering the nip to the thickness of the film leaving the nip (known as the reduction ratio) was 4.15. The rolling was stopped and restarted without any problem.

COMPARATIVE EXAMPLE B

As the film in Example 2 was running, the corona treater was turned off. When the untreated portion of the film entered the nip, the film snapped. The untreated portion could be restarted only by increasing the force to 25 tons. However, the increased force increased the reduction ratio to 6.67, and even with the increased force, the slip was −42 feet per minute.

Example 1 and Comparative Example A show that corona treatment can be used to enable a film to be compression rolled at a faster speed. Example 2 and Comparative Example B show that corona treatment can be used to improve the processability of a film and to enable it to be run at a wider range of reduction ratios. By improving the processability of a film, this invention permits a film to be compression rolled over a wider range of operating conditions.

I claim:

1. In the method of compression rolling wherein a plastic film is passed through the nip of a pair of rolls, the improvement wherein a surface of the film in contact with one of the rolls is subjected to corona discharge prior to the comperssion rolling, whereby the processability of the film is improved.

2. The improvement of claim 1 wherein the film is linear polyethylene having a density greater than about 0.925.

3. The improvement of claim 2 wherein the amount of corona treatment is sufficient to raise the surface energy of the film to at least 42 dynes/cm.

4. The improvement of claim 3 wherein the final thickness of the film is between 0.5 and 6 mils.

* * * * *